(12) United States Patent
Davies

(10) Patent No.: US 10,946,888 B2
(45) Date of Patent: Mar. 16, 2021

(54) STEERING COLUMN ASSEMBLY

(71) Applicant: TRW Limited, Solihull (GB)

(72) Inventor: Niclas Davies, West Midlands (GB)

(73) Assignee: ZF Automotive UK Limited

( * ) Notice: Subject to any disclaimer, the term of this patent is extended or adjusted under 35 U.S.C. 154(b) by 38 days.

(21) Appl. No.: 16/318,719

(22) PCT Filed: Jul. 12, 2017

(86) PCT No.: PCT/GB2017/052040
§ 371 (c)(1),
(2) Date: Jan. 18, 2019

(87) PCT Pub. No.: WO2018/015717
PCT Pub. Date: Jan. 25, 2018

(65) Prior Publication Data
US 2019/0241206 A1    Aug. 8, 2019

(30) Foreign Application Priority Data

Jul. 20, 2016 (GB) ..................... 1612606

(51) Int. Cl.
| | | |
|---|---|---|
| *B62D 1/00* | (2006.01) | |
| *B62D 1/19* | (2006.01) | |
| *B62D 1/185* | (2006.01) | |
| *B62D 1/187* | (2006.01) | |

(52) U.S. Cl.
CPC .............. *B62D 1/192* (2013.01); *B62D 1/185* (2013.01); *B62D 1/187* (2013.01)

(58) Field of Classification Search
CPC .................................................. B62D 1/185

USPC .................................... 74/492, 493; 280/777
See application file for complete search history.

(56) References Cited

U.S. PATENT DOCUMENTS

| | | | |
|---|---|---|---|
| 8,632,098 B2* | 1/2014 | Davies | B62D 1/195 280/777 |
| 2001/0019205 A1* | 9/2001 | Ikeda | B62D 1/184 280/775 |
| 2006/0048597 A1* | 3/2006 | Heiml | B62D 1/16 74/492 |
| 2006/0243089 A1* | 11/2006 | Cymbal | B62D 1/192 74/493 |

(Continued)

FOREIGN PATENT DOCUMENTS

| | | |
|---|---|---|
| GB | 2510822 A | 8/2014 |
| JP | 2002059849 A | 2/2002 |

OTHER PUBLICATIONS

Great Britain Search Report, Application No. GB1612606.2, dated Dec. 21, 2016.

(Continued)

*Primary Examiner* — Toan C To
(74) *Attorney, Agent, or Firm* — Robert James Harwood

(57) ABSTRACT

A steering column assembly is provided that is reach-adjustable. An inner shroud portion and outer shroud portion, which move telescopically relative to one another, each have an elongate slot, the slots at least partially overlapping at all times over the range of adjustment. An end stop extends through, and is movable within, both slots such that it strikes one end of each stop when the steering column assembly is fully retracted and the other end of each slot when the steering column assembly is fully extended.

11 Claims, 2 Drawing Sheets

(56) References Cited

U.S. PATENT DOCUMENTS

| | | | |
|---|---|---|---|
| 2009/0145258 A1 | 6/2009 | Davies et al. | |
| 2011/0265599 A1* | 11/2011 | Owens | B62D 1/185 |
| | | | 74/493 |
| 2012/0085194 A1 | 4/2012 | Inoue | |
| 2015/0375771 A1 | 12/2015 | Tinnin et al. | |
| 2018/0050719 A1* | 2/2018 | Agbor | B62D 1/185 |

OTHER PUBLICATIONS

PCT International Search Report and Written Opinion, Application No. PCT/GB2017/052040, dated Oct. 19, 2017.

* cited by examiner

STEERING COLUMN ASSEMBLY

CROSS-REFERENCE TO RELATED APPLICATIONS

This application is a national stage of International Application No. PCT/GB2017/052040, filed 12 Jul. 2017, the disclosures of which are incorporated herein by reference in entirety, and which claimed priority to Great Britain Patent Application No. 1612606.2, filed 20 Jul. 2016, the disclosures of which are incorporated herein by reference in entirety.

BACKGROUND TO THE INVENTION

This invention relates to improvements in steering column assemblies of the kind that can be adjusted for reach.

It is known to provide a steering column assembly comprising a steering column shroud that surrounds and supports a steering shaft. The shroud is secured to the vehicle body to securely locate the steering shaft and the shaft is in turn supported within the shroud by bearing assemblies so that it can rotate. One end of the shaft is secured to the steering wheel of the vehicle and the other to the road wheels through a steering mechanism, for example a rack and pinion gearbox.

It is important to allow the steering to collapse in the event of a crash where the driver is thrown onto the steering wheel, as may happen if the driver is not wearing a seatbelt. To enable a controlled collapse it is known to provide a two part shroud having an inner shroud portion and an outer shroud portion, an end of the inner shroud portion being located within an end of the outer shroud portion so that the two shroud portions can collapse telescopically. The steering shaft must also be able to collapse, most conveniently by also being formed from two parts that can move telescopically.

The provision of the two part shroud can also function to enable the driver to adjust the overall length of the shroud, thereby adjusting the reach of the steering column assembly. This allows the position of the steering wheel to be moved backwards or forwards in the vehicle to provide a comfortable position for drivers of different shapes and sizes. This requires the two parts of the shroud to be connected together by a releasable clamp assembly.

To prevent damage to the telescopic shroud during adjustment it is known to provide an end stop fixed to the outer shroud portion that engages a slot in the inner portion. As the inner portion moves in and out of the outer portion during adjustment the end stop moves along the slot in the inner shroud portion, eventually striking an end of the slot to prevent further movement. The end stop will strike one end of the slot to limit the amount of reach out adjustment and the other end to limit the amount of reach in adjustment.

SUMMARY OF THE INVENTION

A feature of the present invention is to provide a steering column assembly which ameliorates some of the problems associated with steering column assemblies as described above, in particular where a large amount of reach adjustment is desired from a steering column assembly that has a short length when in the full reach in position.

According to a first aspect the invention provides a steering column assembly comprising a steering column shroud having an inner shroud portion and an outer shroud portion, an end of the inner shroud portion being located within an end of the outer shroud portion so that the two shroud portions can be adjusted telescopically to adjust the overall length of the shroud, in which the outer shroud portion is provided with an elongate slot that extends axially along the outer shroud portion and the inner shroud portion is also provided with an elongate slot that extends axially along the inner shroud portion, the two slots at least partially overlapping at all times over the range of reach adjustment of the steering column assembly, and further comprising an end stop that extends through the slot in the outer shroud portion and slot in the inner shroud portion, the end stop being free to move along both of the slots when the steering column assembly is positioned between the extreme reach in and reach out positions, and arranged to strike an end of the inner slot and an end of the outer slot when the steering assembly reaches the reach out position and to strike the opposing ends of the two slots when the steering assembly reaches the reach in position.

The end stop sets the reach in and reach out positions—defined as the longest and shortest lengths of the shroud. Because it can move along both slots, each slot can be shorter than would be the case if a single slot was provided and the end stop was fixed to one of the shrouds. This makes it possible to set back the slots from the terminal end of the respective shroud portions by an amount that is greater than possible for a single slot for a given overlap of the shrouds and range of adjustment. By setting the slots back from the terminal ends, the strength of the shroud portions at the terminal ends is relatively higher than would be possible if the slot finished closer to the ends.

The end stop may comprise a stem that passes through the two slots and a head that prevents the end stop from being drawn through the slots whilst permitting the sliding movement of the end stop.

To help guide the end stop axially along the slots, the end stop may include an elongate carrier that fits within a pair of grooves that extend along the two sides of the slot in the outer shroud, the carrier in use being able to slide along the grooves. These grooves should extend beyond the ends of the slot.

The end stop may be positioned so that the head is located on the outside of the outer shroud. The slots may be provided in an uppermost region of the two shroud portions so that the head sits above the slots and stops the end stop falling through the slots.

The end stop may be retained in the two slots by a cover member. This may comprise a cover plate that is secured to the outer shroud, for instance by one or more screws or bolts or rivets or other fasteners.

The stem of the end stop may be frangible so that it breaks when subject to a large force applied by the ends of the slots in the event of a crash, thereby enabling the shroud to collapse past the reach in position. As the two shrouds are slightly offset, the compression applied to the stem creates a shear force that will cause the stem to shear in a controlled manner.

The inner shroud portion may be located closer to the steering wheel than the outer shroud portion.

The outer shroud portion may be fixed to a clamp assembly that in use is movable between a first position in which it clamps the outer shroud portion to the inner shroud portion to prevent reach adjustment and a second position in which the outer shroud portion is released from the inner shroud portion to permit reach adjustment.

The steering column assembly may be adjustable for rake as well as reach.

Other advantages of this invention will become apparent to those skilled in the art from the following detailed description of the preferred embodiments, when read in light of the accompanying drawings.

DETAILED DESCRIPTION OF THE INVENTION

Figure 2:
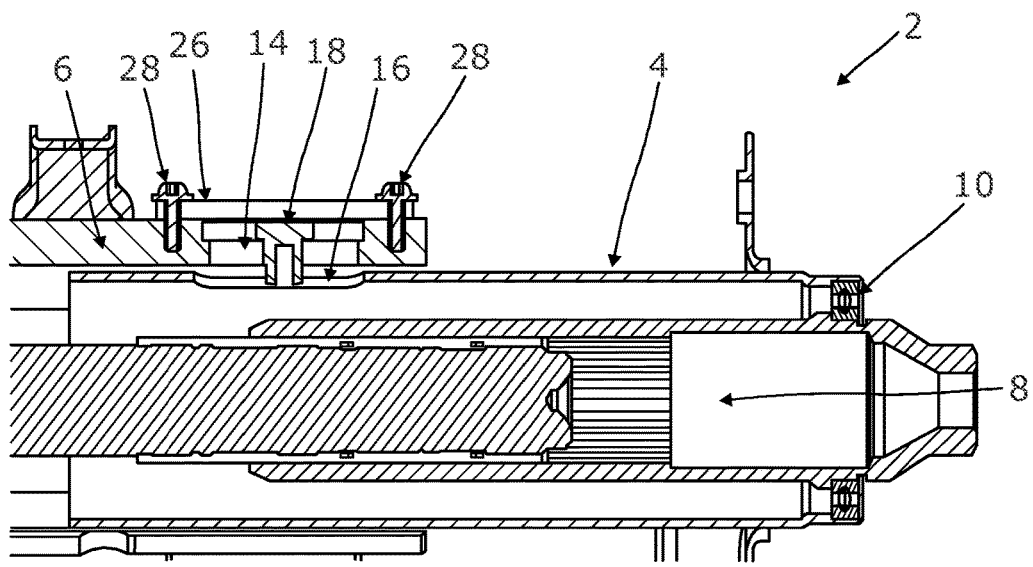
FIG. 2 is a cut away side view of the steering column assembly in an intermediate position between the reach in and reach out positions.
Figure 3:
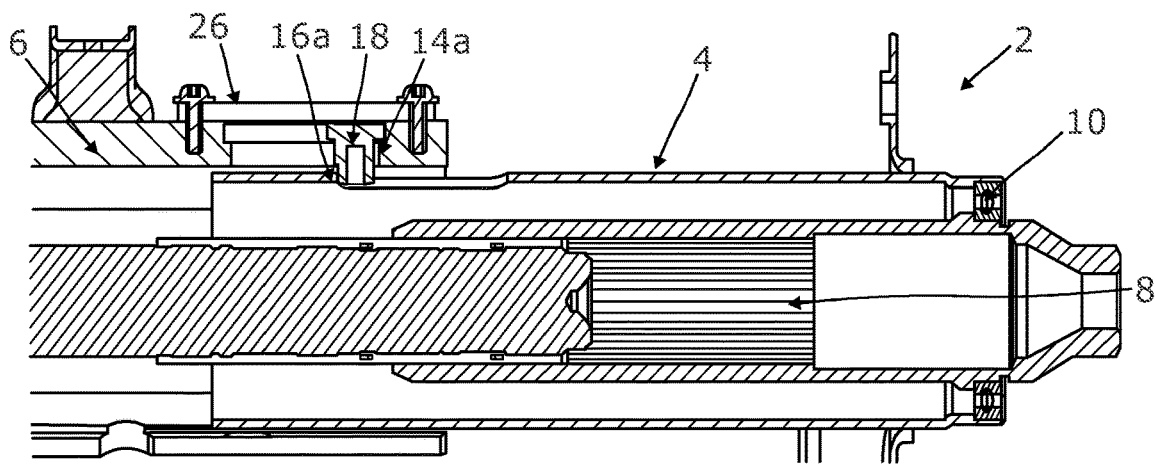
FIG. 3 is a view corresponding to FIG. 2 with the steering column assembly in the reach out position.
Figure 4:
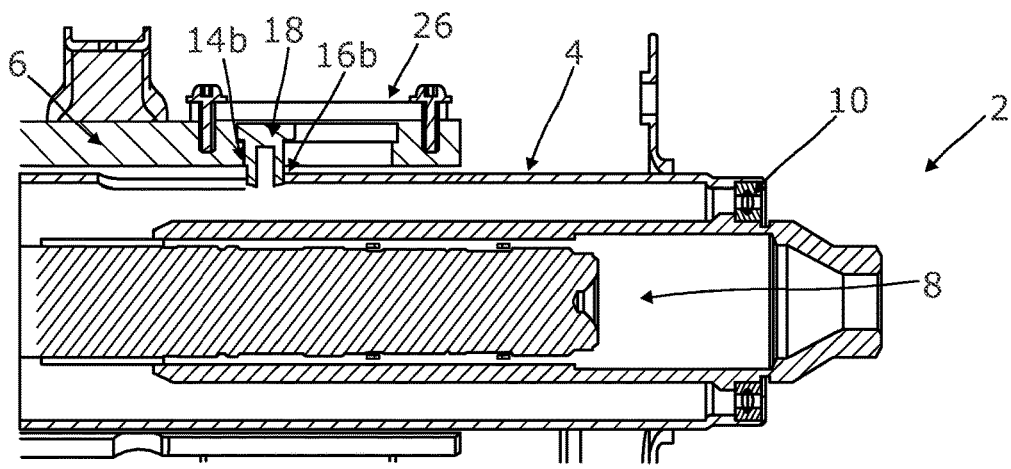
FIG. 4 is a view corresponding to FIG. 2 with the steering column assembly in the reach in position.

As shown in FIGS. 2 to 4, an embodiment of a steering column assembly 2 within the scope of the present invention comprises a two part steering column shroud having an inner shroud portion 4 and an outer shroud portion 6. An end of the inner shroud portion 4 is located within an end of the outer shroud portion 6 so that the two shroud portions can be adjusted telescopically to adjust the overall length of the shroud. In the example shown the outer shroud portion 6 is located furthest from the steering wheel end of the assembly 2 and the inner shroud 4 is located nearer the steering wheel.

Inside the shroud is a two part telescopic steering shaft 8, with the part nearest the steering wheel fitting around the part furthest from the steering wheel. A bearing assembly 10 supports the steering shaft 8 within the shroud.

Figure 1:
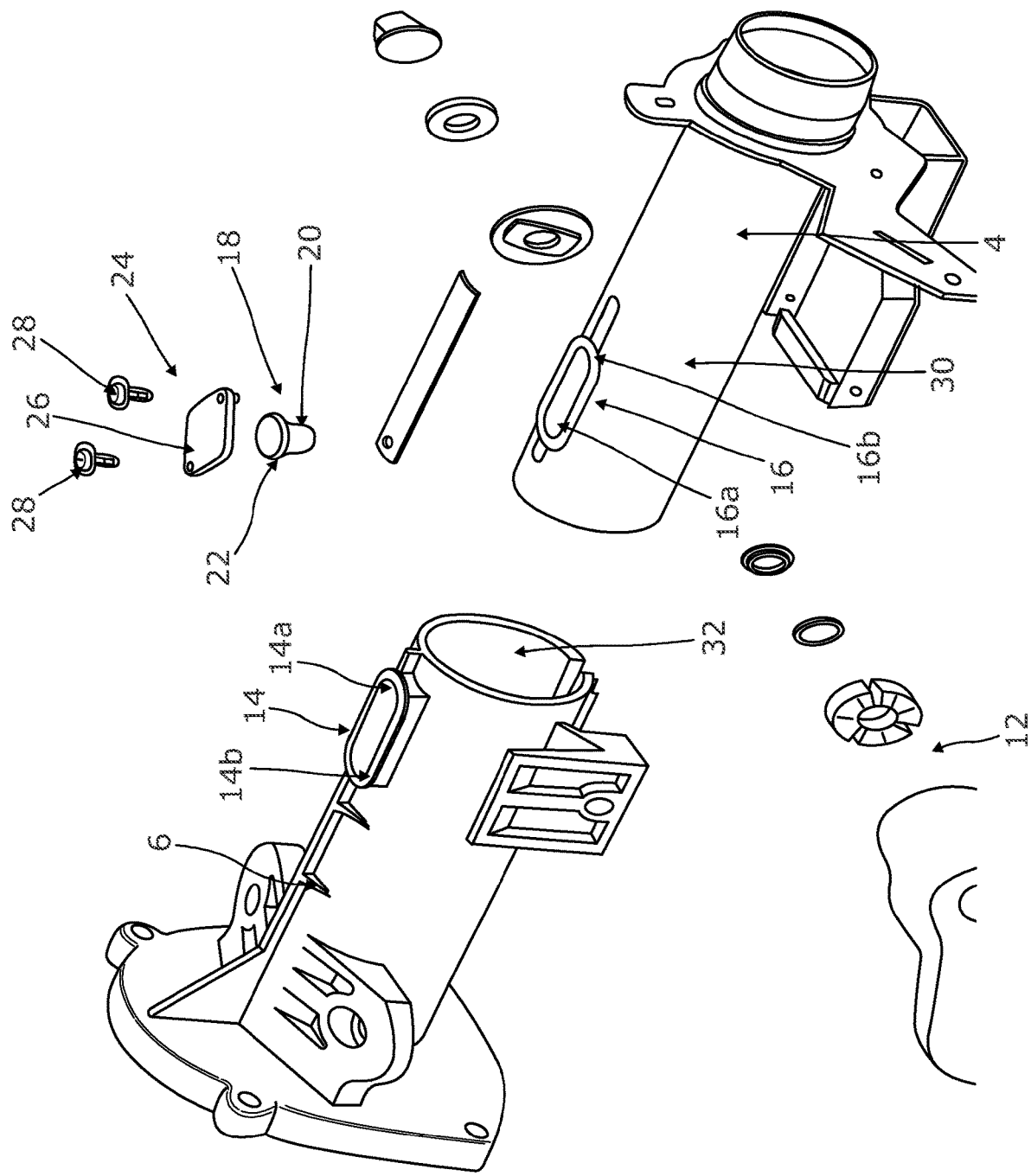
FIG. 1 is an exploded perspective view of the shroud portions and end stop and cover of an embodiment of a steering column assembly that falls within the scope of the present invention.

The shroud is secured to the vehicle body when in a position of use by a clamp mechanism 12. This includes a clamp pin that passes through a hole in a feature integral to the outer shroud portion which can be seen in FIG. 1. This pin also passes through a support bracket (not shown).

The outer shroud portion 6 is provided with an elongate slot 14 that extends axially along the outer shroud portion 6. In this example it is on the top of the shroud but it could be provided in a different position, e.g. on the side of the outer shroud portion 6. The slot 14 is located close to the end of the outer shroud portion 6 nearest the steering wheel. The inner shroud portion 4 is also provided with an elongate slot 16 that extends axially along the inner shroud portion 4, again on the top of the inner shroud portion 4 close at the end that fits within the outer shroud portion 6. The two slots 14, 16 at least partially overlap at all times over the range of reach adjustment of the steering column assembly 2.

The assembly 2 also includes a mushroom shaped end stop 18 that has a stem 20 that extends down through the slot 14 in the outer shroud portion 6 and into the slot 16 in the inner shroud portion 4. An enlarged head 22 of the end stop 18 prevents it falling through the two slots 14, 16. A cover member 24 is fixed over the slot 14 in the outer shroud portion 6. As shown this comprises a plate 26 that is secured by two small screws 28 that engage the outer shroud portion 6.

The cover plate 26 prevents the stem 20 of the end stop 18 coming free of the slots 14, 16, yet does not restrain the movement of the stem 20 along the two slots 14, 16. The width of the stem 20 is less than 10 percent of the length of the slots 14, 16, and the stem 20 fits snugly in the slots 14, 16 so that it is guided along by the edges of the slots 14, 16.

In use, the end stop 18 is free to move along both of the slots 14, 16 when the steering column assembly 2 is positioned anywhere between the extreme reach in and reach out positions. However, the length of the slots 14, 16 and their relative axial positions are chosen so that the stem 20 of the end stop 18 will strike an end 16a of the slot 16 in the inner shroud portion 4 and an end 14a of the slot 14 in the outer shroud portion 6 when the steering assembly 2 reaches the reach out position, the two ends 14a, 16a applying a compressive force to the stem 20. This prevents the shroud extending further than that reach out position. Similarly, the stem will strike the opposing ends 14b, 16b of the two slots 14, 16 when the steering assembly 2 reaches the reach in position. Again, these ends 14b, 16b will apply a compressive force to the stem 20.

The stem 20 is arranged to shear when the compressive force exceeds a predefined level, chosen to be higher than the force expected during adjustment of the shroud for reach but lower than the force expected during a crash where a driver impacts upon the steering wheel. In this case, the stem 20 will shear at the interface between the outer surface 30 of the inner shroud 4 and inner surface 32 of the outer shroud 6 where the shroud portions act on the stem 20. Once sheared, additional collapse of the shroud can be achieved beyond the reach in position.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:
1. A steering column assembly comprising:
a steering column shroud having an inner shroud portion and an outer shroud portion,
an end of the inner shroud portion being located within an end of the outer shroud portion so that the inner and outer shroud portions can be adjusted telescopically to adjust the overall length of the steering column shroud, in which the outer shroud portion is provided with an elongate slot that extends axially along the outer shroud portion and the inner shroud portion is also provided with an elongate slot that extends axially along the inner shroud portion, the two slots at least partially overlapping at all times over a range of reach adjustment of the steering column assembly,
and further comprising an end stop that extends through the slot in the outer shroud portion and the slot in the inner shroud portion, the end stop being free to move along both of the two slots when the steering column assembly is positioned between an extreme reach in and reach out positions, and arranged to strike an end of the inner shroud portion slot and an end of the outer shroud portion slot when the steering column assembly reaches the reach out position and to strike opposing ends of the two slots when the steering column assembly reaches the reach in position
wherein the end stop comprises a stem that passes through the two slots and a head that prevents the end stop from being drawn through the two slots whilst permitting sliding movement of the end stop.
2. The steering column assembly as claimed in claim 1, wherein the end stop includes an elongate carrier that fits within a pair of grooves that extend along two sides of the slot in the outer shroud portion, the carrier in use being able to slide along the pair of grooves.

3. The steering column assembly as claimed in claim 2, wherein the pair of grooves extend beyond the ends of the slot.

4. The steering column assembly as claimed in claim 1, wherein the end stop is positioned to that the head is located on an outside of the outer shroud portion.

5. The steering column assembly as claimed in claim 4, wherein the two slots are provided in an uppermost region of the inner and outer shroud portions so that the head sits above the two slots and stops the end stop falling through the two slots.

6. The steering column assembly as claimed in claim 1, wherein the end stop is retained in the two slots by a cover member.

7. The steering column assembly as claimed in claim 6, wherein the cover member comprises a cover plate that is secured to the outer shroud portion.

8. The steering column assembly as claimed in claim 1, wherein the stem of the end stop is frangible so that it the stem breaks when subject to a large force applied by the ends of the two slots in the event of a crash, thereby enabling the shroud to collapse past the reach in position.

9. The steering column assembly as claimed in claim 1, wherein the inner shroud portion is located closer to a steering wheel than the outer shroud portion.

10. The steering column assembly as claimed in claim 9, wherein the outer shroud portion is fixed to a clamp assembly that in use is movable between a first position in which it clamps the outer shroud portion to the inner shroud portion to prevent reach adjustment and a second position in which the outer shroud portion is released from the inner shroud portion to permit reach adjustment.

11. The steering column assembly as claimed in claim 10, which is adjustable for rake as well as reach.

\* \* \* \* \*